(12) United States Patent
Cherchi et al.

(10) Patent No.: US 9,778,417 B2
(45) Date of Patent: Oct. 3, 2017

(54) BENT OPTICAL WAVEGUIDE (71) Applicant: TEKNOLOGIAN TUTKIMUSKESKUS VTT OY, Espoo (FI)

(72) Inventors: Matteo Cherchi, Espoo (FI); Timo Aalto, Espoo (FI)

(73) Assignee: Teknologian tutkimuskeskus VTT Oy, Espoo (FI)

(*) Notice: Subject to any disclaimer, the term of this patent is extended or adjusted under 35 U.S.C. 154(b) by 0 days.

(21) Appl. No.: 14/436,093

(22) PCT Filed: Oct. 15, 2013

(86) PCT No.: PCT/FI2013/050987
§ 371 (c)(1),
(2) Date: Apr. 16, 2015

(87) PCT Pub. No.: WO2014/060648
PCT Pub. Date: Apr. 24, 2014

(65) Prior Publication Data
US 2015/0260916 A1    Sep. 17, 2015

(30) Foreign Application Priority Data
Oct. 18, 2012    (FI) .................... 20126084

(51) Int. Cl.
G02B 6/26    (2006.01)
G02B 6/125    (2006.01)
G02B 6/02    (2006.01)

(52) U.S. Cl.
CPC .......... G02B 6/262 (2013.01); G02B 6/02047 (2013.01); G02B 6/125 (2013.01)

(58) Field of Classification Search
None
See application file for complete search history.

(56) References Cited

U.S. PATENT DOCUMENTS

| 6,731,841 B1* | 5/2004 | Shirk | G02B 6/125 385/39 |
| 8,737,777 B2* | 5/2014 | Pitwon | G02B 6/125 385/32 |
| 9,044,907 B2* | 6/2015 | Pitwon | B29D 11/00682 |
| 2006/0188196 A1* | 8/2006 | Charters | G02B 6/122 385/33 |

(Continued)

FOREIGN PATENT DOCUMENTS

CN    1539090 A    10/2004
EP    0645649 A2    3/1995

(Continued)

OTHER PUBLICATIONS

Robert N. Sheehan and Steven Horne and Frank H. Peters: "The design of low-loss curved waveguides". Optical and Quantum Electronics, vol. 40, No. 14-15, Aug. 21, 2009, p. 1211-1218, doi: 10.1007/s11082-009-9329-7.

(Continued)

Primary Examiner — Tina Wong
(74) Attorney, Agent, or Firm — Seppo Laine Oy (57) ABSTRACT An optical multi-mode HIC (high index contrast) waveguide (102, 104, 201, 301) for transporting electromagnetic radiation in the optical waveband, the waveguide comprising a guiding core portion (204) with higher refractive index, and cladding portion (206) with substantially lower refractive index configured to at least partially surround the light guiding core in the transverse direction to facilitate confining the propagating radiation within the core, the waveguide being configured to support multiple optical modes of the propagating radiation, wherein the waveguide incorporates a bent waveguide section (202) having bend curvature that is configured to at least gradually, preferably substantially continuously, increase towards a maximum curvature of said section from a section end.

13 Claims, 5 Drawing Sheets

(56) References Cited

U.S. PATENT DOCUMENTS

| | | | |
|---|---|---|---|
| 2007/0025672 A1* | 2/2007 | Suzuki | G02B 6/10 385/129 |
| 2007/0036500 A1 | 2/2007 | Suzuki et al. | |
| 2012/0027339 A1 | 2/2012 | Mathai | |
| 2013/0223788 A1* | 8/2013 | Koos | G02B 6/30 385/14 |

FOREIGN PATENT DOCUMENTS

| | | |
|---|---|---|
| EP | 1464997 A1 | 10/2004 |
| JP | H07159635 A | 6/1995 |
| JP | 2007052328 A | 3/2007 |
| JP | 2014041252 A | 3/2014 |

OTHER PUBLICATIONS

Wangqing Yuan and Douglas C. Hall: "A General Scaling Rule for Matched Bend Waveguides". J. Lightwave Technology, vol. 29, No. 24, Nov. 15, 2011, p. 3786-3796, doi: 10.1109/JLT.2011.2174335.

Zhen Hu and Ya Yan Lu: "Computing Optimal Waveguide Bends With Constant Width". J. Lightwave Technology, vol. 25, No. 10, Oct. 15, 2007, p. 1361-3167, doi: 10.1109/JLT.2007.904033.

K. Solehmainen, T. Aalto, J. Dekker, M. Kapulainen, M. Harjanne and P. Heimala, "Development of multi-step processing in silicon-on-insulator for optical waveguide applications", Journal of Optics A: Pure and Applied Optics, vol. 8, pp. S455-S460 (2006)].

Sheehan R N et al: "The Design of Low-Loss Curved Waveguides", Optical and Quantum Electronics, VO.40, No. 14-15, Aug. 21, 2009, p. 1211-1218, XP002758764, DOI 10.1007/S11082-009-9329-7. *Abstract* *p. 1216; Figures 4A, 6*.

Chin et al: High-index-contrast waveguides and devices. Applied Optics, vol. 44, No. 15, May 20, 2005, pp. 3077-3086.

Kelderman et al: Bends in polymeric multimode waveguides.

Melloni et al: Experimental confirmation of matched bends. Optics Letters, vol. 29, No. 5, Jan 1, 2004, pp. 465-467.

Pitwon et al: Polymer optical waveguicies with reduced in-plane bend loss for electro-optical PCBs. SPIE, vol. 8264.

* cited by examiner

BENT OPTICAL WAVEGUIDE

FIELD OF THE INVENTION

Generally the present invention relates to optics and photonics. In particular, however not exclusively, the present invention concerns HIC (high index contrast) optical multi-mode waveguides and bending thereof.

BACKGROUND

Optical waveguides including multi-mode dielectric waveguides are designed for the transmission of electromagnetic waves in the optical band. An optical waveguide is basically a light conduit configured, by means of properly selected core and surrounding cladding materials with higher and lower refractive indexes, respectively, to confine and transport light therein without leaking it to the environment.

Optical waveguides can be classified according to their geometry (slab (planar) or strip, cylindrical, etc.), mode structure (single-mode, multi-mode), refractive index distribution (step or gradient index) and e.g. material (glass, polymer, semiconductor, etc.). Refraction of light at the core/cladding interface is generally governed by the Snell's law. When light arrives at the interface between the core and cladding materials above a so-called critical angle it is completely reflected back into the core material based on a phenomenon called 'total internal reflection' (TIR).

In terms of wave-optics, a multi-mode waveguide is, as the name alludes, capable of guiding the waves of several modes, i.e. a discrete set of solutions of Maxwell's equations with boundary conditions, in addition to the main mode. In practice, the larger the core dimensions of the waveguide the greater the number of modes is. The multi-mode waveguides and related equipment for interfacing the light with the waveguide are typically easier to construct than the single-mode counterparts due to e.g. larger dimensions generally enabling the utilization of coarser, more affordable hardware and manufacturing methods. However, multimode distortion limits the 'bandwidth×distance' product of multi-mode waveguides in contrast to single-mode solutions. It also complicates (or prevents) the realization of advanced waveguide circuits that densely integrate a large number of waveguide components (couplers, filters etc.). Therefore, such circuits are typically realized with single-mode waveguides, while multimode waveguides are mainly used in point-to-point links and to realize relatively simple waveguide circuits.

Multimode waveguides can also be locally used as part of single-mode waveguide circuits. They can form components, such as multi-mode interference (MMI) couplers, where multiple modes are temporarily excited, but the light eventually couples back into single-mode waveguides. They can also be used to propagate light only in the fundamental mode, but in this case light must be coupled adiabatically between the single and multimode waveguide sections to avoid the excitation of higher order modes. And finally, multimode waveguides can be placed behind single-mode waveguides when multimode distortion is no longer relevant, for example when coupling light into a large-area photodetector.

By definition, the modes of a multi-mode straight waveguide propagate unperturbed without mutual coupling, unless some perturbation occurs, such as a change in the waveguide shape. In particular, bends can induce significant coupling between the different modes such that in the straight section at the end of the bend, also higher order modes (HOM) will be in general excited, even if only the fundamental mode was excited in a straight section preceding the bend. The higher the curvature 1/R (bend radius R), the higher is the degree of unwanted coupling and, in general, also the higher the number of significantly excited modes.

Indeed, one basic design rule of single-moded photonic integrated circuits dictates that any bent waveguide must be single-moded so that the undesired coupling between the modes and subsequent detrimental mode beating and power radiation in the bend may be avoided. For integration purposes the bend radius is typically to be minimized, which requires the use of HIC waveguides. Further, the higher the index contrast the smaller the waveguide shall be in order to ensure the single-mode condition. Sub-micron waveguides could be utilized for achieving dense integration, but they pose many additional challenges, including polarization dependence and low coupling efficiency to optical fibre modes. Furthermore, for scalable production they require expensive state-of-the-art fabrication tools in order to resolve submicron features and are also very sensitive to nanometer-scale fabrication errors.

As a reference one may introduce a single-moded rib waveguide that can be realized on a silicon-on-insulator (SOI) wafer by dry etching the originally 4 µm thick Si layer down to approximately 2 µm thickness around an unetched 3.5 µm wide rib that forms the waveguide. Despite its large dimensions and high index contrast this waveguide is single-moded because the higher order modes radiate power away from the rib along the surrounding 2 µm thick Si slab. However, the slab also enables the fundamental mode to radiate power into the slab when the rib waveguide is bent. Therefore the minimum bending radius for such a rib waveguides is approximately 4 mm. To avoid the radiation losses of the fundamental mode in a bend the rib waveguide can be locally converted into a multimode strip waveguide or the etch depth can be locally increased around the bend [Reference: K. Solehmainen, T Aalto, I Dekker, H. Kapulainen, H. Harjanne and P. Heimala, "*Development of multi-step processing in silicon-on-insulator for optical waveguide applications*", Journal of Optics A: Pure and Applied Optics, vol 8, pp. S455-S460 (2006)]. However, in practice this has led to the inevitable excitation of HOMs if the bending radius has been reduced by a factor of 10 or more with respect to the corresponding low-loss rib waveguide bend.

The goal of shrinking the bend radius of multimode HIC waveguides could be sought by a matched arc approach, which relies on matching the length of a circular bend to an integer multiple of beating lengths between the fundamental mode and the first higher order mode (HOM) of the bent waveguide to ensure that, at the end of the bend, only the fundamental mode will be excited despite the fact that HOMs have been excited during propagation in the bent section. Nevertheless, the obtained bending radii are still relatively large, in practice e.g. two orders of magnitude larger than the waveguide width, and in particular, manufacturing thereof is challenging due to very stringent tolerance requirements.

SUMMARY OF THE INVENTION

The objective is to at least alleviate one or more aforesaid problems and to provide an optical multi-mode HIC waveguide with improved, tight bend(s).

The objective is achieved by different embodiments of an optical multi-mode HIC waveguide for transporting electromagnetic radiation in the optical waveband, the waveguide comprising guiding core portion with higher refractive index, and cladding portion with substantially lower refractive index configured to at least partially surround the light guiding core in the transverse direction to facilitate confining the propagating radiation within the core, the waveguide being configured to support multiple optical modes of the propagating radiation, wherein the relative refractive index contrast between said core and cladding portions is about 25% or higher, and the waveguide incorporates a bent waveguide section having a bend curvature that is configured to at least gradually, preferably substantially continuously, increase towards a maximum curvature of said section from a section end.

The maximum curvature of the bent section may appear at either end of the section or between the ends thereof such as half-way the section length. In the latter case, either or both of the ends may be associated with the common minimum curvature of the section, or contain at least local minima. The curvature may increase towards the maximum from one end and decrease away therefrom to the other end of the section. Both section ends may be substantially straight while the bent section is applied to change the direction of the waveguide. The section ends may be mutually parallel or non-parallel. In some embodiments, the waveguide may consist of the bent section. Alternatively, the waveguide may also define a plurality of further sections each of which is straight or bent. Generally, several bent sections may also be joined together to construct more complex bend shapes. For example, a substantially straight section could be followed by one or more bent sections and optionally a further substantially straight section. In terms of radiation propagation, one section end could be referred to as light input, or incoupling, end and the other as light output, or outcoupling, end.

Various optimized bend shapes such as 'U'-bends or 'L'-bends, or a spiral segment shape, may be constructed utilizing the principle of the present invention.

In one embodiment, the bent section contains two mirror-symmetric sub-sections adjacent and substantially adjoining each other, the maximum curvature being optionally realized at the border of said sub-sections, i.e. half-way the overall section length. For example, a 'U' or 'L' bend may be constructed accordingly. As a further example of the application of symmetry in designing various bend forms, a segment of a double-end spiral form could be constructed, wherein the (center) point of symmetry bears the minimum curvature (straight).

In another, either supplementary or alternative, embodiment the curvature is substantially linearly varying with the bend length so as to linearly increase towards the intermediate maximum from the minima at section ends.

In a further, either supplementary or alternative, embodiment the effective bend radius of curvature is in the order of magnitude of the waveguide width. As the curvature varies, the minimum radius is even smaller.

Yet in a further, either supplementary or alternative, embodiment the core portion defines a substantially planar core layer and the cladding portion optionally further defines at least one substantially planar adjacent layer. Alternatively, the core portion defines a cylindrical inner core layer surrounded by the cladding layer in transverse directions relative to the predetermined propagation direction (guiding direction) of the radiation.

Still, in a further, either supplementary or alternative, embodiment the refractive index (n) contrast between the core and cladding $\Delta n = (n_{core} - n_{cla})/n_{cla}$ is substantially about 50% or higher, and preferably about 100% or higher.

In a further, either supplementary or alternative, embodiment the waveguide is a dielectric waveguide, preferably a strip waveguide. Preferably the core comprises dielectric material. Alternatively or additionally, the cladding may comprise dielectric material.

In a further, either supplementary or alternative, embodiment the core portion may be or include at least one material selected from the group consisting of: semiconductor, Si, Ge, GaAs, InP, CdTe, ZnTe, silicon oxide, $Si_3N_4$, $TiO_2$, polymer and diamond.

In a further, either supplementary or alternative, embodiment the cladding portion may be or include at least one material selected from the group consisting of: air, silica containing glass, and polymer.

In a further, either supplementary or alternative, embodiment the bent section defines a matched bend (described hereinlater in more detail). Alternatively, it may define a generic, unmatched bend.

In various embodiments, the obtained waveguide may be of substantially micron scale or smaller, for example.

An electronic, optical, optoelectronic and/or photonic device may comprise an embodiment of the waveguide suggested herein. An optical circuit such as integrated optical circuit may comprise an embodiment of the waveguide suggested herein. A microring element such as a microring resonator may comprise an embodiment of the waveguide suggested herein. Optionally multi-stage cascaded MZI (Mach-Zehnder interferometer) may comprise an embodiment of the waveguide suggested herein. Optionally long and low-loss delay line may comprise an embodiment of the waveguide suggested herein. Also an MMI reflector (MMI coupler with the two outputs connected with a U-bend) may comprise an embodiment of the waveguide suggested herein. Different communications or sensor devices incorporating an embodiment of the presented waveguide may be manufactured.

The utility of the suggested solution arises from multiple issues depending on the embodiment. For example, ultrasmall bends with low losses in micron-scale HIC multimode waveguides may be obtained. Both matched and generic (unmatched) bends with varying curvature may be capitalized. The applicable bandwidth may be considerably large. The designed bends feature minimal bending radii comparable to the waveguide width. Experimental results further confirm the overall effectiveness, robustness and low losses of the realized bends. As an outcome, the 'footprint', i.e. the occupied surface area, and cost of the associated circuits are reduced and previously unaffordable elements may become feasible.

For example, the size of multi-mode interferometric reflectors may be remarkably shrunk. On the other hand, bends with larger radii and lower losses may be used, for example, to design long spirals with low footprint. E.g. an area of about 0.5×0.5 mm2 could somewhat easily allocate an 8 cm long spiral. The proposed bends are also expected to enable the fabrication of microring resonators with high finesse. Various embodiments of the present invention are suitable for use with SOI (silicon-on-insulator) platforms including thicker SOIs and interfaceable with optical fibres. Micron-scale features of the proposed designs allow for fabrication with relaxed lithographic resolution by tools that are much less expensive than the ones usually needed for scalable production of nanophotonic devices. High confinement of light in multi-mode HIC waveguides makes the proposed solution much less sensitive to fabrication errors, wavelength changes and mode polarization than the existing nanophotonic counterparts.

Generally, waveguides with small birefringence, good fiber coupling, and robustness to fabrication errors, may be obtained in contrast to e.g. fixed curvature bends and/or nanophotonic waveguides.

The expression "a number of" refers herein to any positive integer starting from one (1), e.g. to one, two, or three.

The expression "a plurality of" refers herein to any positive integer starting from two (2), e.g. to two, three, or four.

The expression "effective bend radius" (Reff) refers herein to the radius of an arc that has the same starting and final points and the same starting and final directions with the bend of the present invention.

The term "HIC" refers herein to high index contrast at least in the direction of the bend radius, and at least on the outer side of the bend regarding e.g. a rib waveguide with a lateral groove, whereas the contrast may be either high or low in the perpendicular direction, i.e. the direction of the bending axis.

The term "optical waveband" refers herein to frequencies between about 250 nm and 10000 nm thus including visible light and part of ultraviolet and infrared bands. The provided waveguide may be configured to operate in a number of selected sub-ranges only.

The terms "a" and "an", as used herein, are defined as one or more than one.

Various different embodiments of the present invention are also disclosed in the dependent claims.

BRIEF DESCRIPTION OF THE RELATED DRAWINGS

Next the invention is described in more detail with reference to the appended drawings in which.

DETAILED DESCRIPTION OF THE EMBODIMENTS

Figure 1:
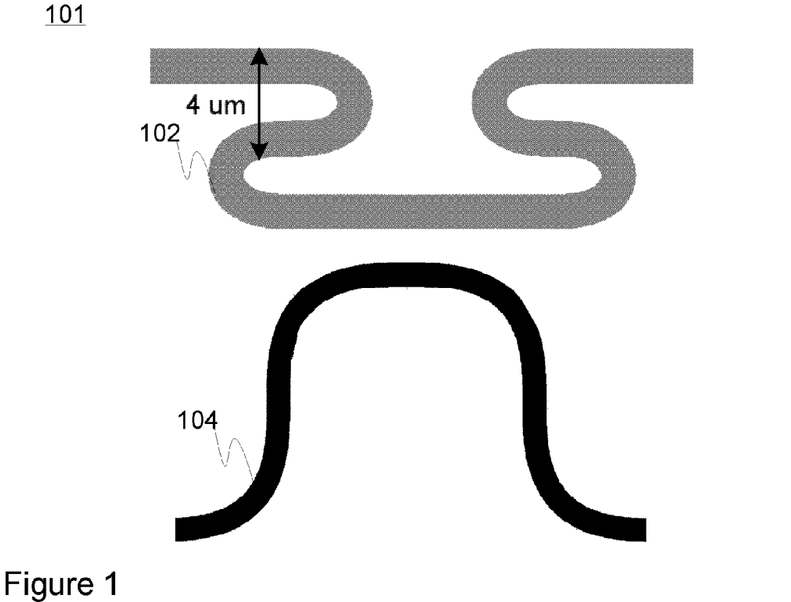
FIG. 1 illustrates the basic principles of the present invention via different applicable bend shapes.

In FIG. 1 at 101, by way of example only, two different embodiments of the present invention are generally illustrated at 102 and 104. Bends such as 'U'-bends, 'S'-bends, 'U'-bends and practically any bend of a desired degree may be manufactured. Different basic bend shapes may be cleverly combined to establish more complex bends and (mirror/point) symmetry may be exploited to design the bends.

For instance, two 'U'-bends could be combined to form an 'S'-bend, and the 'U'-bend itself could be constructed from two mirror-symmetric halves, i.e. doubly symmetric structures could be established. However, a skilled reader will understand such symmetry is not obligatory for utilizing the present invention to establish bends, i.e. the bend portions preceding and following e.g. the point of maximum curvature of a bend do not have to be mirror-symmetric.

The obtained bends are optically efficient and provide small footprint due to optimized, yet small, non-constant bend radii. The order of magnitude of the waveguide width and the bend radii may be substantially the same and e.g. micrometer scale configurations are achievable.

Figure 2:
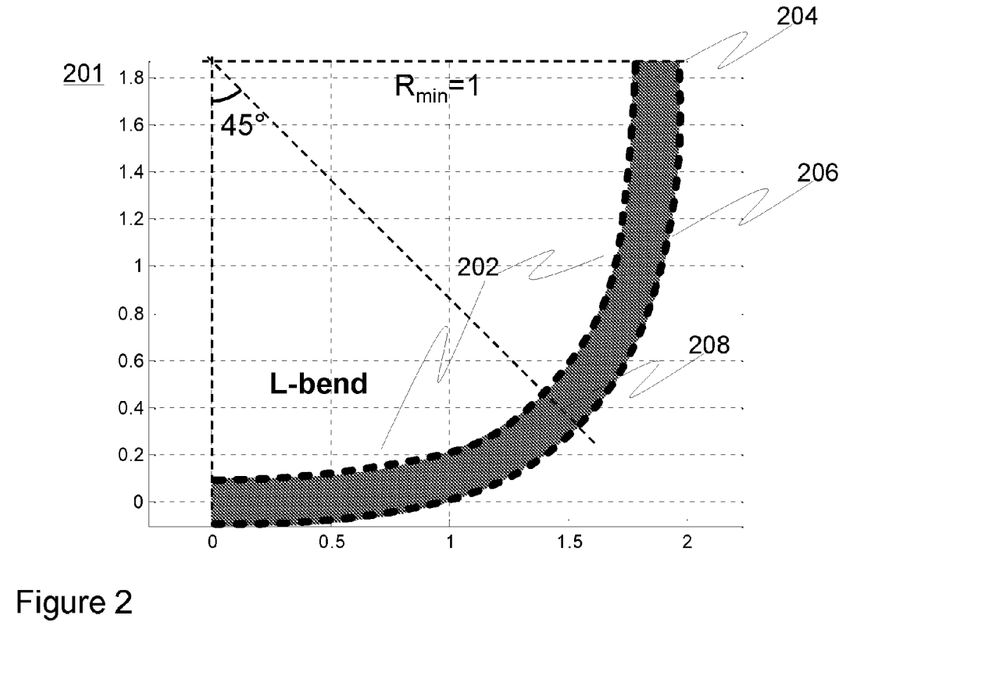
FIG. 2 illustrates an 'L'-bend (90 deg bend) in accordance with an embodiment of the present invention.

FIG. 2 illustrates, at 201, a cross-section (in the bend plane) of an 'L'-bend (90 deg bend) forming at least part, i.e. section, of an optical multi-mode HIC waveguide in the direction of light propagation in accordance with an embodiment of the present invention and incorporating two mirror-symmetric bend sub-sections 202 with curvature linearly varying with length and bending radii normalized to the minimum value. The waveguide, such as a strip waveguide, further contains core 204 and cladding 206 portions for transporting and confining light, respectively. It shall be noted that in some embodiments the cladding portion 206 may be formed by non-solid material, optionally gaseous material such as air. The point of maximum curvature 208 is located half way the section length at the border of the mirror-symmetric sub-sections 202.

Generally, instead of utilizing e.g. a generic prior art arc with constant radius of curvature for implementing the bend and thus abruptly changing between straight and curved (arc) portions, the radius of curvature is to be gradually, preferably substantially continuously, varied to produce the bend with more continuous and smoother transitions, while the bend size is minimized.

For the 'L'-bend or practically any other bend of a given angle θ joining two straight waveguides, two mirror-symmetric sections may be exploited, each of them enabling bending by θ/2, which in the case of 'L' implies using two mirror-symmetric 45 deg bends.

Figure 3A:
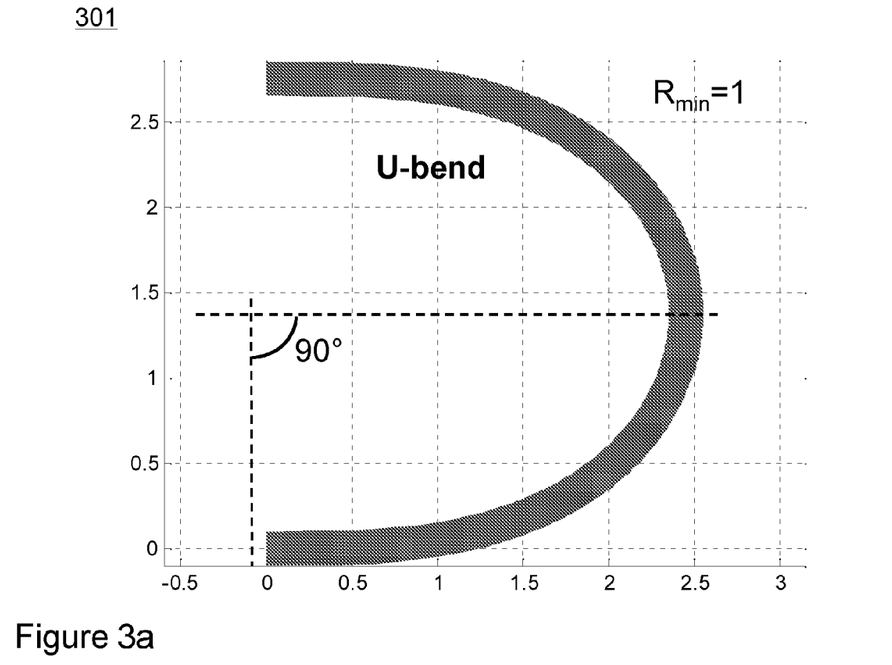
FIG. 3a illustrates a 'U'-bend (180 deg bend) in accordance with an embodiment of the present invention.

FIG. 3a illustrates, at 301, a correspondingly designed, optimized 'U'-bend for optical multi-mode HIC waveguide.

Reverting both to FIG. 2 and FIG. 3a, the linearly varying L-bend has an effective radius Reff=1.87 Rmin, and in the case of the U-bend the effective radius is Reff=1.38 Rmin.

Figure 3B:
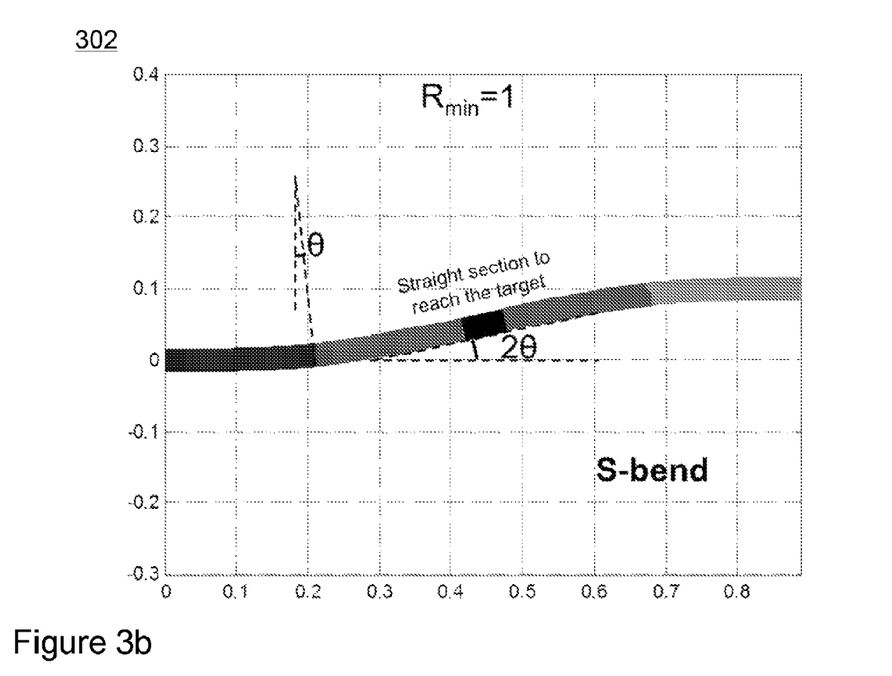
FIG. 3b illustrates an 'S' bend in accordance with an embodiment of the present invention.

FIG. 3b illustrates, at 302, one more embodiment of a bend, in this case an 'S' bend, designed in accordance with the present invention.

Figure 4:
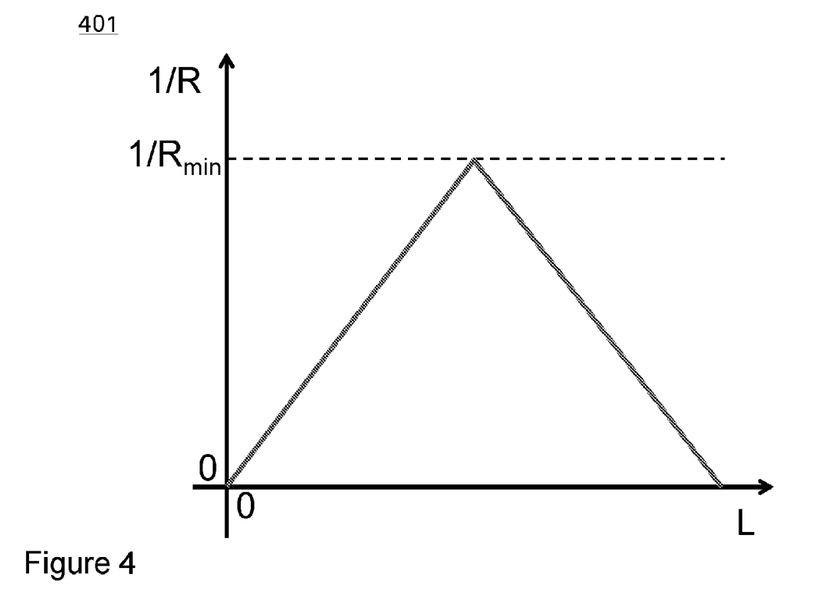
FIG. 4 depicts bend curvature change according to an embodiment of the present invention.

With reference to FIG. 4, the curvature (1/R) of a bend optimized according the teachings provided herein may change substantially linearly with the bend length as depicted. The curvature reaches a maximum value at half-length (radius R of curvature is then at minimum) and reduces back to zero (or other minimum), i.e. mirror-symmetric bend realization is shown.

As a mathematical background regarding various embodiments of the present invention, a bend with curvature that is linearly varying with path length may be characterized by means of so-called Euler spiral, which can be accurately calculated through expansion series of Fresnel integrals (for practical purposes 2 or 3 expansion terms are usually sufficient). Therefore, the associated bends are also called hereinafter as 'Euler bends'.

For example, the effective or minimum radius of the applied bend curvature may substantially be in the order of magnitude of the waveguide width, preferably about 20 times the waveguide width or smaller, more preferably about ten times the width or smaller, and most preferably about two times the width or smaller.

Figure 5A:
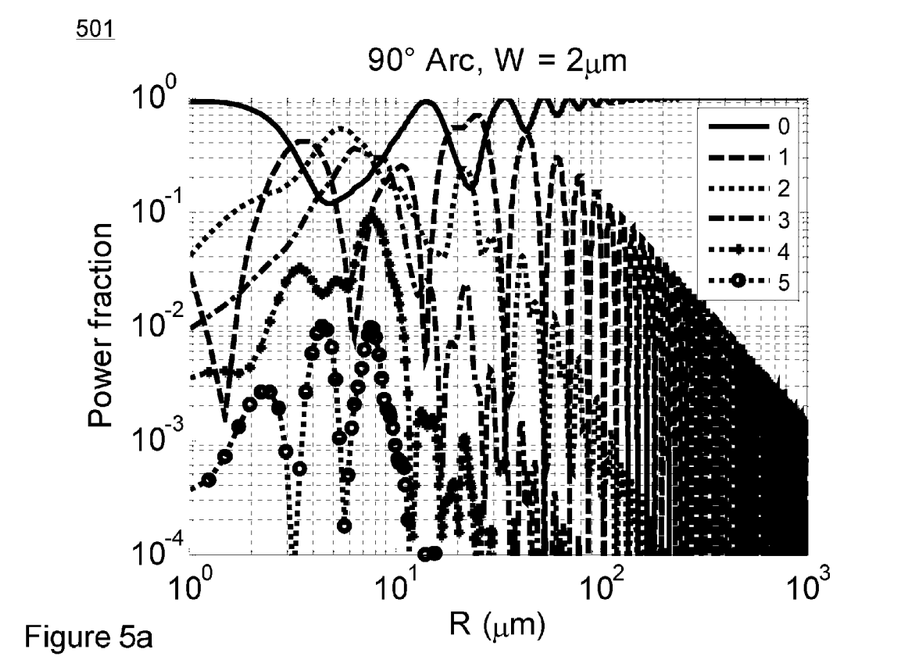
FIG. 5a illustrates power coupling in the case of a prior art 90 deg arc bend as a function of bend radius.
Figure 5B:
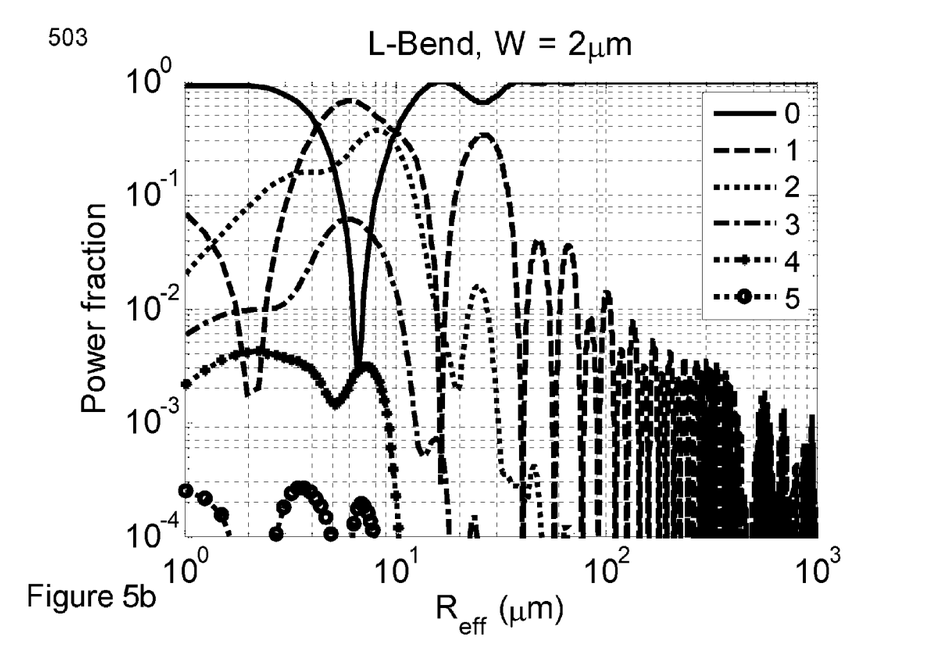
FIG. 5b illustrates power coupling in the case of a 'L'-bend (90 deg bend) in accordance with an embodiment of the present invention as a function of the effective bend radius.

FIGS. 5a and 5b illustrate modeled power coupling to different modes at the output (straight) of 2 µm wide silicon strip waveguide with generic 90 degree arc and Euler 'L' bends, respectively, as a function of the constant bend radius (arc) or the effective bend radius (Euler bend, in which case the minimum radius is 1.87 times smaller). The wavelength is 1.55 µm.

As a person skilled in the art will immediately realize from the coupling curves 501 of FIG. 5a relating to a prior art arc, up to 4 HOMs can be excited by about 1% (−20 dB) or more.

At R≈11 µm there seems to be a first resonant coupling to the fundamental (0th order) mode, but with poor suppression of coupling to 1st, 2nd and 3rd HOMs, resulting in just about 90% output into the fundamental mode. The first practically useful resonance (i.e. the lowest order low-loss matched bend) corresponds to R≈34.4 µm, with fundamental mode coupling >99%. For larger R values there are other matched bend occurrences and all HOMs, except 1st order, can be neglected in practice. The power oscillations between this mode and the fundamental mode slowly damp with R and for R>400 µm the maximum coupling to the HOM is suppressed by more than 20 dB. One could adopt e.g. such suppression level as the threshold to define the minimum R value ensuring low-loss operation of the bend. Unlike with the matched bend case, where power is significantly coupled to HOMs in the bent section and then completely coupled back to the fundamental mode at the very end of the bend, proper unmatched operation requires that coupling to HOMs is always suitably suppressed during propagation. In other words, the matched-bend is a resonant system, whereas the generic unmatched bend is not. It is clear that unmatched operation ensures broader operation bandwidth and higher tolerance to fabrication errors. In general, in any bend of any shape (i.e. with non-constant curvature) one can distinguish between two working principles: a resonant one based on matching the bend length to the beating length between fundamental and HOMs—so ensuring high coupling into the fundamental mode at the very end of the bend only—and another one simply ensuring low coupling to HOMs at any propagation step.

Reverting to the coupling curves 503 of FIG. 5b, the modeled generic, i.e. unmatched with reference to the above discussion, bend corresponds to Reff=75 µm, i.e. more than 5 times smaller than the generic arc. Furthermore, the first useful matched bend occurs at Reff=16.6 µm, i.e. at less than half the size of the smallest matched arc, and the second one at Reff=37.4 µm, which is comparable with the arc bend, but with much better performance.

Figure 6A:
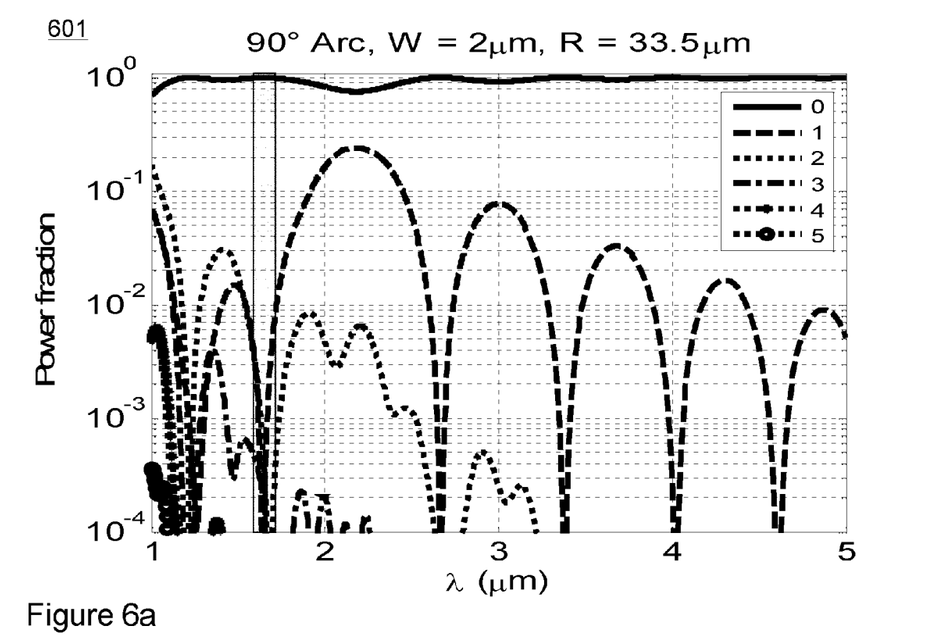
FIG. 6a illustrates power coupling in the case of a typical matched 90 deg arc bend from the standpoint of bandwidth utilization.
Figure 6B:
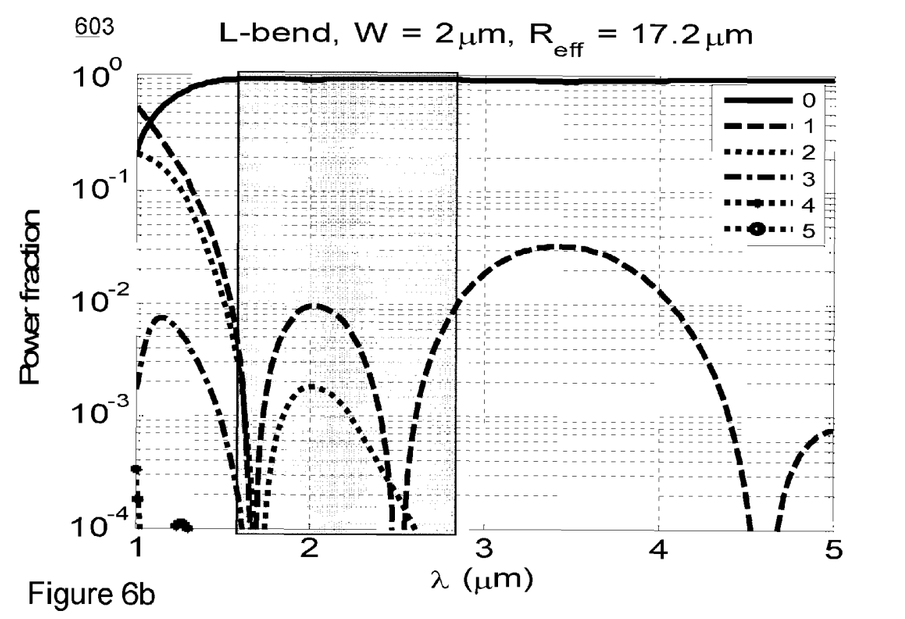
FIG. 6b illustrates power coupling in the case of a matched 'L'-bend (90 deg bend) according to an embodiment of the present invention from the standpoint of bandwidth utilization.
Figure 6C:
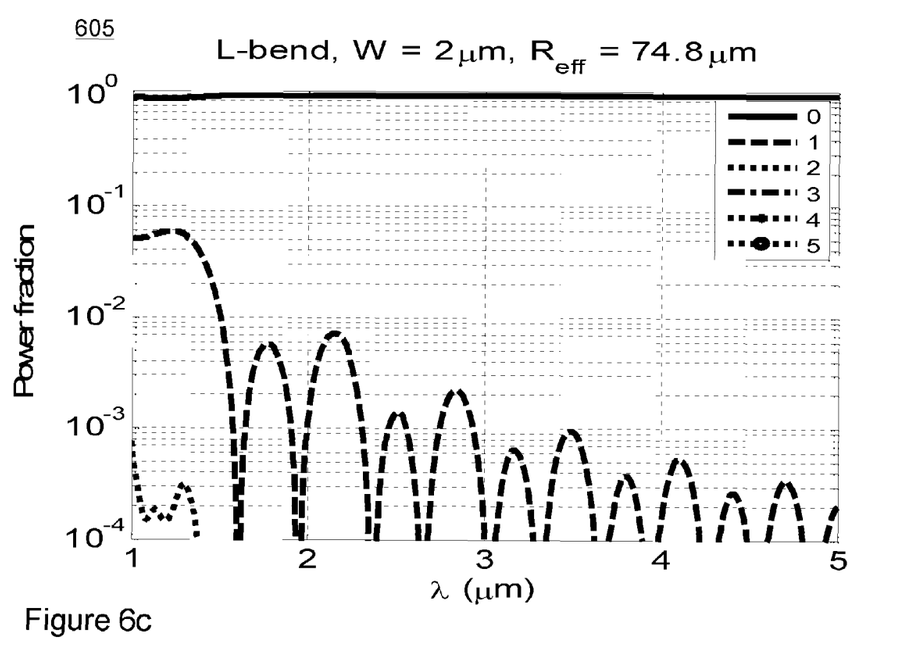
FIG. 6c illustrates power coupling in the case of a generic (unmatched) 'L'-bend (90 deg bend) according to an embodiment of the present invention from the standpoint of bandwidth utilization.

FIGS. 6a, 6b, and 6c illustrate power coupling in the case of a prior art type 90 deg arc bend, matched 'L'-bend according to an embodiment of the present invention, and generic 'L'-bend according to another embodiment of the present invention, respectively, from the standpoint of bandwidth utilization. As a motivation for such contemplation, it is typically beneficial to analyze the spectral response of the bends for various reasons. The responses reflect the associated bends' tolerance to fabrication errors since one important design parameter is the ratio between the waveguide size and the wavelength, whereupon changing the wavelength is like changing the size and vice-versa. It shall be noted that in the depicted case the matched bends were not precisely set to the transmission peak for 1.55 µm wavelength, but were optimized slightly off-resonance to ensure the highest operation bandwidth.

Besides the size shrinkage, the comparison between the smallest matched arc (FIG. 6a) and the smallest matched Euler L-bend (FIG. 6b) highlights an order of magnitude broader bandwidth (indicated by the shaded rectangular areas) for the Euler L-bend. Also the generic Euler L-bend (FIG. 6c) yields excellent performance. These simple examples show that the matched and generic Euler bends can be not only much smaller than corresponding matched and generic arc bends, but also perform great in terms of bandwidth and tolerances to fabrication errors. Similar results hold for different waveguide widths and different bend angles.

From the previous spectral analysis one may further derive a general guideline: in order to design a bend working in a given wavelength range, the bend should be targeted to the smaller wavelengths of that range, and then optimized to cover the broadest possible range of longer wavelengths.

Furthermore, a design that works at a given wavelength λ1 can be always rescaled to a different wavelength λ2 by simply rescaling waveguide width and bending radii by a factor λ2/λ1 advantageously supplemented with some minor optimization to take into account effective refractive index dispersion of the given waveguide.

Even with a highly multi-mode≈1 µm wide waveguide, it is possible, for example, to design low loss (<0.1 dB per 180°) matched Euler 'U'-bends with Reff≈1.4 µm like the ones shown in FIG. 1 at 102 or e.g. a generic Euler bend with Reff≈1 µm in the case of 500 nm wide waveguide. This is superior to the contemporary solutions in connection with standard nanophotonic circuits based on single mode waveguides, where the minimum bending radius is limited to about 2 µm, because both submicron waveguide thickness and width, required for single-mode operation, significantly lower the index contrast, also making the mode much more affected by sidewall-roughness-induced loss.

Still, the experimental results show that some of the designed bends have losses <0.05 dB. Thus a plurality of bends may be cascaded without inducing unacceptable losses to the aggregate solution.

A skilled person may on the basis of this disclosure and general knowledge apply the provided teachings in order to implement the scope of the present invention as defined by the appended claims in each particular use case with necessary modifications, deletions, and additions, if any.

In the context of the present invention, the (radius of) bend curvature is indeed preferably gradually, most preferably substantially continuously, changed instead of constant curvature or abrupt changes, but in practical circumstances also small deviations from this basic rule may be implemented in the form of minor discontinuation points, for example, to ease manufacturing or for some other reason as far as they don't induce too high losses.

Curvature dependence on path length doesn't have to be the linear symmetric continuous function shown e.g. FIG. 4 (which defines the Euler spiral), but may be any other substantially continuous function starting from a smaller value (preferably zero), reaching a maximum value and then typically going back to a small value.

Further, the invention is generally applicable to e.g. any HIC dielectric strip waveguide, wherein the core may include any semiconductor like Si, Ge, GaAs, InP, CdTe, ZnTe, and their compounds, or some other HIC material like doped or undoped silicon oxide, Si3N4, TiO2, high-index polymer or diamond, while the cladding can be established of any low index material such as air, silica glasses, polymers, etc. working at any wavelength.

As previously mentioned, the HIC condition is, in principle, mandatory in the direction of the bend radius only, and actually, the contrast may be high just on the outer side of the bend (e.g. a rib waveguide with a lateral groove). Index contrast is not a decisive factor in the perpendicular direction (i.e. the direction of the bending axis). The waveguide may be multi-mode in both directions.

Furthermore, the waveguide width may in general vary along the bend (e.g. smaller width corresponding to smaller bending radii).

Considering the diversity of potential applications, the invention may have useful applications in connection with highly multi-mode waveguides (tens to hundreds of microns in size) proposed e.g. for low cost optical interconnects on printed circuit boards. The invention can also be applied to nanophotonic silicon waveguides both to reduce bend losses and shrink bend sizes using multimode sections with large widths.

One interesting embodiment is strip waveguide technology with reference to e.g. micron scale Si cores (e.g. 1-10 µm thickness and width) surrounded by silica, that are intrinsically multi-mode in both directions. For instance, the light may be coupled from an optical fibre to the input (rib) waveguide of an integrated circuit or some other predetermined target element. Then when a small bend is needed, the (rib) waveguide, which is preferably single-moded, may be converted into a strip waveguide of suitable width that can be bent with very small footprint and high performances thanks to the present invention. Furthermore, conversion to strip waveguides is anyway needed in many other devices as well (through etched MMIs, AWGs, etc.), whereupon the invented tight and low-loss bends will be also a useful alternative to the 90° turning mirrors that could be used for e.g. rib waveguides.

Still, the suggested bending approach is preferable whenever many cascaded bends are needed, since the losses are clearly lower than with the turning mirrors (e.g. about 0.3 dB per turn).

The invention claimed is:
1. An optical multi-mode HIC (high index contrast) waveguide, for transporting electromagnetic radiation in an optical waveband, the waveguide comprising:
    a guiding core portion of a first refractive index,
    a cladding portion of a refractive index lower than the first refractive index, the cladding portion configured to at least partially surround the guiding core portion in a transverse direction to facilitate confining the propagating radiation within the guiding core,
    a bent waveguide section defined by section ends corresponding bent portions of the guiding core portion and the cladding portion, the bent waveguide section including a bend curvature that is configured to gradually increase towards a maximum curvature value from one of the section end within said waveguide section in the direction of another section end,
    the waveguide being configured to support multiple optical modes of the transported electromagnetic radiation, and,
    wherein the relative refractive index contrast between said guiding core and said cladding, portion is about 25% or higher.

2. The waveguide of claim 1, wherein the bend curvature increases from at least local minima at the section ends towards the maximum between the section ends.

3. The waveguide of claim 1, wherein the section ends are substantially straight.

4. The waveguide of claim 1, wherein the bent section, contains two substantially mirror-symmetric sub-sections, said waveguide optionally further comprising another adjacent, bent waveguide section with similar mirror-symmetric sub-sections to establish a predetermined double symmetric structure.

5. The waveguide of claim 1, wherein the curvature is substantially linearly varying with the bend length between the section end and the point of maximum curvature.

6. The waveguide of claim 1, wherein the minimum radius of curvature is substantially on the order of magnitude of the waveguide width, which is at least approximately two times the waveguide width or smaller.

7. The waveguide of claim 1, wherein the core portion defines a substantially planar core layer.

8. The waveguide, of claim 1, wherein the relative refractive index contrast between said core portion and said cladding portion is approximately at least 50%.

9. The waveguide of claim 1, wherein the guiding core portion comprises dielectric material.

10. The waveguide of claim 1, wherein the core portion comprises at least one material selected from the group consisting of: semiconductor, Si, Ge, GaAs, InP, CdTe, ZnTe, Si3N4, doped or undoped silicon oxide, TiO2, diamond, and their compounds.

11. The waveguide of claim 1, wherein the cladding portion comprises at least one material selected from the group consisting of: air, silica-containing glass, and polymer.

12. The waveguide of claim 1, wherein the waveguide width is at least substantially on the order of magnitude of microns or less.

13. The waveguide of claim 1, selected from the group consisting of: electronic devices, optoelectronic devices, photonic devices, optical circuits, integrated optical circuits, microring elements, microring resonators, interferometers, multi-stage cascaded Mach-Zehnder interferometers, delay lines, reflectors, multi-mode interference reflectors, communications devices, SOI (silicon-on-insulator) devices, and sensors.

* * * * *